J. H. BRADY.
MEASURING TANK.
APPLICATION FILED SEPT. 11, 1916.
1,308,572.
Patented July 1, 1919.
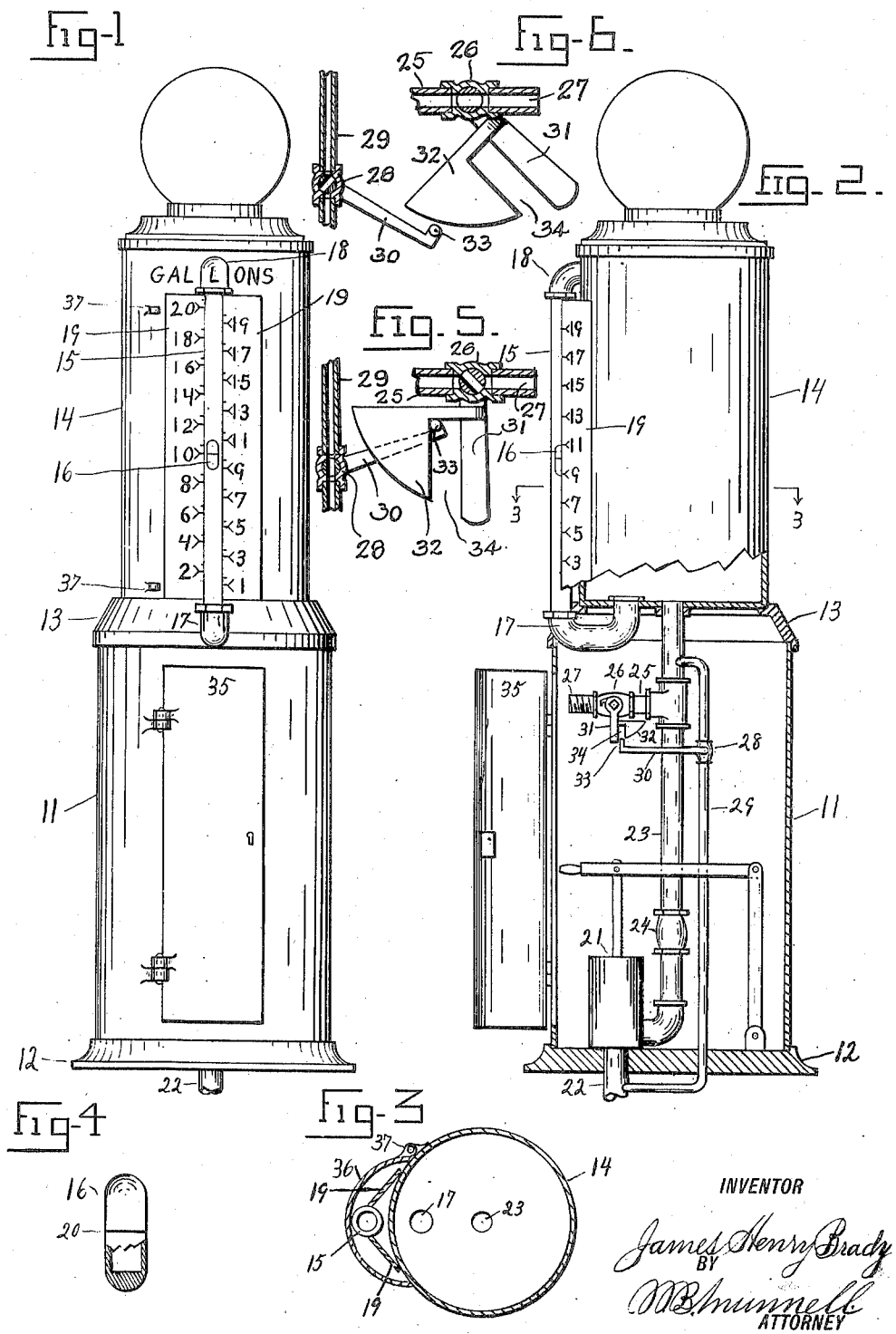
INVENTOR
James Henry Brady
BY
M. B. Munnell
ATTORNEY

UNITED STATES PATENT OFFICE.

JAMES HENRY BRADY, OF LOUISVILLE, KENTUCKY, ASSIGNOR, BY MESNE ASSIGNMENTS, TO VISIBLE MEASURE GASOLINE DISPENSER COMPANY OF AMERICA, OF LOUISVILLE, KENTUCKY, A CORPORATION OF SOUTH DAKOTA.

MEASURING-TANK.

1,308,572.  Specification of Letters Patent.  Patented July 1, 1919.

Application filed September 11, 1916. Serial No. 119,358.

*To all whom it may concern:*

Be it known that I, JAMES HENRY BRADY, a citizen of the United States, and residing in the city of Louisville, county of Jefferson, and State of Kentucky, have invented certain new and useful Improvements in Measuring-Tanks, of which the following is a specification.

This invention relates to measuring tanks and is especially applicable to the dispensing of gasolene to motor driven vehicles.

The present practice is to store inflammable, or explosive fluids such as gasolene, in underground tanks and pipes are led therefrom to pumps which are conveniently located, to supply customers, usually near the street curb. These pumps are provided with cylinders of rated capacity adapted to deliver a given volume of fluid at each complete stroke, means being employed to require a complete stroke at each operation, and mechanism being employed to visually indicate the number of complete strokes and the number of partial strokes so that the customer may know how much fluid he is getting. Theoretically devices of this character will correctly indicate the amount of fluid delivered and in practice they do so as long as there is no wear in the piston, with consequent leakage of fluid thereby. Practically the wear of the piston, and of the connecting mechanism is such as to render the indicating mechanism unreliable.

An object of this invention is to provide a measuring tank into which fluid may be pumped prior to delivery and wherein the customer may see the amount he is to receive.

With the foregoing and other objects in view, the invention consists of the novel construction and arrangement of parts illustrated in the accompanying drawing which forms a part of this specification, wherein is set forth an embodiment of the invention, but it is to be understood that such changes and modifications may be resorted to as come within the scope of the appended claims.

In the accompanying drawing, wherein similar reference characters designate like parts in the several views: Figure 1, is a front elevation of an embodiment of my invention: Fig. 2, a side elevation partly in section, and with parts broken away to show the construction: Fig. 3, a cross section on line 3—3 of Fig. 2: Fig. 4, an elevation of the float with a portion broken away. Fig. 5 is a sectional view of the drain cock and cut off valve, the handles thereof and parts carried thereby, showing the drain cock open and the cut off valve closed. Fig. 6 is a similar view, showing the drain cock closed and the cut off valve open.

In the construction illustrated herewith a casing —11—, preferably cylindrical, rests upon a base —12— and is surmounted by an annular flange —13— which supports a measuring tank —14—. This tank is provided with a gage glass, or tube —15— of sufficient size to permit the free movement therein of a float —16— which is large enough to be clearly discernible at a considerable distance. The gage glass is connected with the tank by means of fittings —17— and —18—. A graduated scale —19— is placed on both sides of the gage glass and serves to indicate the number of gallons contained in the tank when the fluid stands at the different levels indicated by the scale. Gasolene and many other fluids, are practically transparent and it would be difficult to observe the height thereof in the gage glass, consequently the float 16 is used. The float, preferably hollow, is weighted at the lower end so that it will sink in the fluid to such an extent that a central transverse mark —20— thereon will be even with the surface of the fluid and when the mark coincides with an index on the scale 19, say the figure "10," it shows that there are that many gallons in the tank. Positioned on the base, within the casing is a pump —21— of a suitable type, which is connected by means of a pipe —22— with a suitable source of supply such as an underground reservoir, and with the measuring tank 14, by means of a pipe —23—. A check valve —24— interposed in the continuity of the pipe prevents the fluid from returning from the measuring tank. An extension —25— from the pipe 23, at a point below the tank, and above the check valve, is provided with a cut-off valve —26— and a screw threaded terminal —27— for the connection thereto of a flexible conduit (not shown) for leading the measured fluid to a desired delivery point.

In operation the pump is operated to force fluid into the tank until the float indicates that the desired amount, say 10 gallons has entered, should more than the amount desired be inadvertently forced into the tank, the drain cock —28— may be opened and the surplus amount allowed to return, through the drain pipe —29— to the reservoir. The cut-off valve is then opened and the fluid permitted to flow from the measuring tank into the receptacle provided by the purchaser. I have provided means whereby the drain cock cannot be opened while the cut-off valve is open and vice-versa. The handle —30— of the drain cock 28 is extended into proximity to the handle —31— of the cut-off valve. The handle 31 is provided with an arcuate lateral extension —32— which is adapted to be moved by the opening movement of the cut-off valve, into the path of the handle 30 and prevent the opening movement of the drain cock. The extension 32 is spaced apart from the handle proper by an interval or recess —34— which, when the cut off valve is closed, lies in the path of and may be entered by a lateral projection —33— on the handle of the drain cock, the presence of the projection 33 in the recess preventing the opening of the cut off valve. The casing is provided with a door —35— by means of which access may be had thereto. A protecting cover —36— for the gage glass and scales is removably supported by lugs —37—.

From the foregoing description it will be seen that I have produced a device for dispensing fluids that is absolutely reliable, that may be tested and certified by official inspectors of weights and measures, that exhibits to the purchaser the exact amount of fluid he is to receive before it is delivered to him and one that is economical in construction and facile in operation.

Having thus described my invention so that anyone may make and use same, I claim:

1. In a liquid dispenser, a tank, a delivery pipe therefor, a drain pipe and a service pipe located adjacent to each other, a valve in the drain pipe having a stem provided with a crank handle, a valve in the service pipe having a stem provided with a crank handle, the latter having a lateral arcuate extension spaced apart from the handle proper by a notch or interval, the drain valve handle having a lateral extension adapted to engage said notch when the valve is opened to thereby lock the service valve from being opened, and to engage said arcuate extension when the service valve is opened to thereby lock the drain from being opened.

2. In a liquid dispenser, a tank, a delivery pipe to said tank, a drain pipe and a service pipe for said tank located adjacent to each other, a valve in the drain pipe having a stem provided with a crank handle, a valve in the service pipe having a stem provided with a crank handle projecting toward and the path of which intersects the path of the service valve handle, the latter having a lateral arcuate extension spaced apart from the handle proper by a notch or interval, the drain valve handle having a lateral angular extension adapted to engage said notch when the valve is opened to thereby lock the service valve from being opened and to engage said arcuate extension when the service valve is opened to thereby lock the drain valve from being opened.

JAMES HENRY BRADY.